(12) United States Patent
Livshits et al.

(10) Patent No.: US 9,038,185 B2
(45) Date of Patent: May 19, 2015

(54) EXECUTION OF MULTIPLE EXECUTION PATHS

(75) Inventors: Benjamin Livshits, Kirkland, WA (US); Benjamin Goth Zorn, Woodinville, WA (US); Christian Seifert, Seattle, WA (US); Clemens Kolbitsch, Vienna (AT)

(73) Assignee: Microsoft Technology Licensing, LLC, Redmond, WA (US)

( * ) Notice: Subject to any disclaimer, the term of this patent is extended or adjusted under 35 U.S.C. 154(b) by 138 days.

(21) Appl. No.: 13/339,322

(22) Filed: Dec. 28, 2011

(65) Prior Publication Data

US 2013/0174258 A1    Jul. 4, 2013

(51) Int. Cl.
G06F 11/00        (2006.01)
G06F 11/36        (2006.01)
G06F 21/56        (2013.01)

(52) U.S. Cl.
CPC .......... *G06F 11/3612* (2013.01); *G06F 21/566* (2013.01); *G06F 11/3688* (2013.01)

(58) Field of Classification Search
CPC .................................. G06F 8/70; G06F 11/00
USPC ........................................................... 726/24
See application file for complete search history.

(56) References Cited

U.S. PATENT DOCUMENTS

| | | | |
|---|---|---|---|
| 4,819,233 A * | 4/1989 | Delucia et al. | 717/129 |
| 5,537,540 A * | 7/1996 | Miller et al. | 714/38.13 |
| 6,151,643 A * | 11/2000 | Cheng et al. | 710/36 |
| 7,117,488 B1 * | 10/2006 | Franz et al. | 717/144 |
| 7,350,235 B2 | 3/2008 | Jordan | |
| 7,367,024 B2 * | 4/2008 | Barua et al. | 717/157 |
| 7,707,634 B2 | 4/2010 | Sandu et al. | |
| 7,849,507 B1 | 12/2010 | Bloch et al. | |
| 8,713,679 B2 | 4/2014 | Zorn | |
| 2005/0235136 A1 | 10/2005 | Barsotti et al. | |
| 2006/0075468 A1 | 4/2006 | Boney et al. | |
| 2007/0113282 A1 | 5/2007 | Ross | |
| 2007/0152854 A1 | 7/2007 | Copley | |
| 2007/0239993 A1 | 10/2007 | Sokolsky et al. | |
| 2007/0240215 A1 | 10/2007 | Flores et al. | |
| 2007/0250930 A1 | 10/2007 | Aziz et al. | |
| 2008/0263659 A1 | 10/2008 | Alme | |
| 2009/0089759 A1 | 4/2009 | Rajan et al. | |

(Continued)

OTHER PUBLICATIONS

"Non-Final Office Action", U.S. Appl. No. 13/031,061, (Jan. 22, 2013), 13 pages.

(Continued)

*Primary Examiner* — William Powers
(74) *Attorney, Agent, or Firm* — Steve Wight; Judy Yee; Micky Minhas (57) ABSTRACT

Techniques for execution of multiple execution paths are described. In one or more embodiments, an execution of a portion of executable code is conditioned upon a particular environment-specific value. For example, the execution of the executable code can cause one type of output if the value of the variable equals a particular value, and can cause a different type of output if the value of the variable equals a different value. Techniques discussed herein can enable the executable code to be executed such that multiple outputs are produced, e.g., by executing the code according to the different values for the variable. In implementations, the multiple outputs can be analyzed for various attributes, such as presence of malware, implementation and coding errors, and so on.

20 Claims, 5 Drawing Sheets

(56) References Cited

U.S. PATENT DOCUMENTS

| | | | |
|---|---|---|---|
| 2009/0265692 A1* | 10/2009 | Godefroid et al. | 717/128 |
| 2009/0300764 A1 | 12/2009 | Freeman | |
| 2009/0327688 A1 | 12/2009 | Li et al. | |
| 2009/0328185 A1 | 12/2009 | Van den Berg et al. | |
| 2010/0031359 A1 | 2/2010 | Alme | |
| 2010/0180344 A1 | 7/2010 | Malyshev et al. | |
| 2010/0205674 A1 | 8/2010 | Zorn et al. | |
| 2011/0030060 A1 | 2/2011 | Kejriwal | |
| 2011/0239294 A1 | 9/2011 | Kim et al. | |
| 2012/0216280 A1 | 8/2012 | Zorn et al. | |

OTHER PUBLICATIONS

"Data Execution Prevention", Retrieved from <<http://technet.microsoft.com/en-us/library/cc738483.aspx>> on Mar. 11, 2011, 10 pages.

"Final Office Action", U.S. Appl. No. 12/369,018, (Dec. 16, 2011), 19 pages.

"Google Safe Browsing API", Retrieved from <<http://code.google.com/apis/safebrowsing/>> on Mar. 11, 2011, 2 pages.

"Non-Final Office Action", U.S. Appl. No. 12/369,018, (Jun. 24, 2011), 17 pages.

"Non-Final Office Action", U.S. Appl. No. 12/369,018, (Mar. 20, 2012), 19 pages.

"The "Aurora" IE Exploit Used against Google in Action", Retrieved from"http://praetorianprefect.com/archives/2010/01/the-aurora-ie-exploit-in-action/" on Mar. 10, 2011, (Jan. 15, 2010), 10 pages.

Abadi, Martin et al., "Control-Flow Integrity", Retrieved from <<http://research.microsoft.com/pubs/64250/ccs05.pdf>>, (Nov. 2005), 14 pages.

Akritidis, et al., "Stride: Polymorphic Sled Detection through Instruction Sequence Analysis", Retrieved from <<http://dcs.ics.forth.gr/Activities/papers/stride-IFIP-SEC05.pdf>>, (2005), 16 pages.

Akritidis, Periklis et al., "Preventing Memory Error Exploits with WIT", 2008 IEEE Symposium on Security and Privacy. Retrieved from <<http://ieeexplore.ieee.org/stamp/stamp.jsp?tp=&arnumber=4531158>>, (May 2008), 15 pages.

Anagnostakis, et al., "Detecting Targeted Attacks Using Shadow Honeypots", Retrieved from <<http://www.cs.columbia.edu/~angelos/Papers/2005/replay.pdf>>, (2005), 16 pages.

Bates, Daniel et al., "Regular Expressions Considered Harmful in Client-Side XSS Filters", Retrieved from <<http://www.collinjackson.com/research/xssauditor.pdf>>, (Apr. 26, 2010), 9 pages.

Bisht, Prithvi et al., "XSS-GUARD: Precise Dynamic Orevention of Cross-Site Scripting Attacks", Retrieved from <<http://www.cs.uic.edu/~pbisht/XSSGuard_DIMAVA2008_bisht.pdf>> 5th Conference on Detection of Intrusions and Malware & Vulnerability Assessment (DIMVA'2008) Springer LNCS link Paris, France, (Jul. 10, 2008), 20 pages.

Brain, Marshall "How C Programming Works", available at <http://computer.howstuffworks.com/c28.htm>,(2004), 4 pages.

Buscher, Armin et al., "MonkeyWrench—Boesartrige Webseiten in Die Zange Genommen", Retrieved from <<https://www.bsi.bund.de/cae/servlet/contentblob/538316/publicationFile/30388/Armin_Buescher_pdf.pdf>>, (May 12, 2009), 9 pages.

Canali, Davide et al., "Prophiler: A Fast Filter for the Large-scale Detection of Malicious Web Pages", Retrieved from <<http://www.cs.ucsb.edu/research/tech_reports/reports/2010-22.pdf>>, (Nov. 2010), 10 pages.

Castro, Miguel et al., "Securing Software by Enforcing Data-flow Integrity", Retrieved from <<http://research.microsoft.com/en-us/um/people/tharris.papers/2006-osdi.pdf>>, (Nov. 2006), 14 pages.

Cova, Marco et al., "Detection and Analysis of Drive-by-Download Attacks and Malicious Javascript Code", Retrieved from <<www.cs.ucsb.edu/~vigna/publications/2010_cova_kruegel_vigna_Wepawet.pdf>>, (2010), 10 pages.

Cowan, Crispan et al., "StackGuard: Automatic Adaptive Detection and Prevention of Buffer-Overflow Attacks", Proceedings of the 7thUSENIX Security Symposium, San Antonio, TX. Retrieved from <<http://citeseerx.ist.psu.edu/viewdoc/download?doi=10.1.1.123.964&rep=rep1&type=pdf >>, (Jan. 26, 1998), 16 pages.

Egele, Manuel et al., "Defending Browsers against Drive-by Downloads: Mitigating Head-spray Code Injection Attacks", Proceeding DIMVA '09 Proceedings of the 6th International Conference on Detection of Intrusions and Malware, and Vulnerability Assessment. Retrieved from <<https://www.seclab.tuwien.ac.at/papers/driveby.pdf>>, (2009), 19 pages.

Ernst, Michael D., "Self-defending Software: Collaborative Learning for Security", Retrieved from <http://www.uwtv.org/programs/displayevent.aspx?rID=24539&fID=4946> on Mar. 17, 2011, (2008), 1 page.

Feinstein, Ben et al., "Caffeine Monkey: Automated Collection, Detection and Analysis of Malicious Javascript",Collection, Retrieved from <<http://www.secureworks.com/research/blog/wp-content/uploads/bh-usa-07-feinstein_and_peck-WP.pdf>>, (2007), 14 pages.

Hoffman, Billy "Circumventing Automated Javascript Analysis", HP Web Security Research Group, Retrieved from <<http://ju12.tistory.com/attachment/cfile8.uf@15550B0E4AB2D0C60189B9.ppt>>, (2007), 64 pages.

Howard, Fraser "Malware with Your Mocha? Obfuscation and Anit-Emulation Tricks in Malicious Javascript", Retrieved from <<http://www.sophos.com/security/technical-papers/malware_with_your_mocha.pdf>>, (Sep. 2010), 18 pages.

Howard, Michael "Address Space Layout Randomization in Windows Vista", Retrieved from <<http://blogs.msdn.com/b/michael_howard/archive/2006/05/26/address-space-layout-randomization-in-windows-vista.aspx>> on Mar. 11, 2011. (May 26, 2006), 3 pages.

Howard, Michael "Update on Internet Explorer 7, DEP, and Adobe Software", Retrieved from <<http://blogs.msdn.com/michael_howard/archive/2006/12/12/update-on-internet-explorer-7-dep-and-adobe-software.aspx>> on Mar. 11, 2011, (Dec. 12, 2006), 4 pages.

Hunt, Galen et al., "Detours: Binary Interception of Win32 Functions", Retrieved from <<http://citeseerx.ist.psu.edu/viewdoc/download?doi=10.1.1.48.3709&rep=rep1&type=pdf>>, (Feb. 1999), 9 pages.

Kawach, Rami "NEPTUNE: Detecting Web-Based Malware via Browser and OS Instrumentation", Retrieved from <<https://community.qualys.com/servlet/JiveServlet/previewBody/1434-102-4-1675/Black_Hat_US_2010_Neptune.pdf>> (Jul. 27, 2010), 10 pages.

Kijewski, Piotr et al., "The HoneySpider Network—Fighting Client-Side Threats", Retrieved from <<http://www.honeyspider.net/wp-content/uploads/2009/06/hsn-first2008-article-v02.pdf>>, (2008), 15 pages.

Kiriansky, Vladimir et al., "Secure Execution via Program Shepherding", Proceedings of the 11th USENIX Security Symposium (Security '02), San Francisco, CA. Retrieved from <<http://groups.csail.mit.edu/cag/rio/security-usenix.pdf>>, (Aug. 2002), 16 pages.

Likarish, Peter et al., "Obfuscated Malicious Javascript Detection Using Classification Techniques", Retrieved from <<http://citeseerx.ist.psu.edu/viewdoc/download?doi=10.1.1.155.5680&rep=rep1&type=pdf>>, (2010), 8 pages.

Livshits, Ben et al., "Nozzle & Zozzle: Javascript Malware Detection", Retrieved from <<http://research.microsoft.com/en-us/projects/nozzle/>>, (Jun. 5, 2009), 2 pages.

Meyerovich, Leo A., et al., "ConScript: Specifying and Enforcing Fine-grained Security Policies for Javascript in the Browser", Retrieved from <<http://citeseerx.ist.psu.edu/viewdoc/download?doi=10.1.1.164.2441&rep=rep1&type=pdf>> (Nov. 18, 2009), 16 pages.

Miller, et al., "Bypassing Windows Hardware-enforced Data Execution Prevention", Retrieved from <<http://uninformed.orq/?v=2&a=4>>, (Oct. 2, 2005), 5 pages.

Moshchuk, Alexander et al., "A Crawler-based Study of Spyware on the Web", Retrieved from <<http://citeseerx.ist.psu.edu/viewdoc/download?doi=10.1.1.104.2921&rep=rep1&type=pdf>>, (2006), 17 pages.

Moshchuk, Alexander et al., "SpyProxy: Execution-based Detection of Malicious Web Content", Retrieved from <<https://www.usenix.org/events/sec07/tech/full_papers/moshchuk/moshchuk.pdf>>, (Sep. 20, 2007), 16 pages.

(56) References Cited

OTHER PUBLICATIONS

Nadji, Yacin et al., "Document Structure Integrity: A Robust basis for Cross-site Scripting Defense", Retrieved from <<http://www.cs.berkeley.edu/~prateeks/papers/dsi-ndss09.pdf>>, (2009), 20 pages.

Nazario, Jose "PhoneyC: A Virtual Client Honeypot", Retrieved from <<http://usenix.org/events/leet09/tech/full_papers/nazario/nazario.pdf>>, Apr. 1, 2009, 8 pages.

Newsome, James et al., "Polygraph: Automatically Generating Signatures for Polymorphic Worms", Retrieved from <<http://www.cs.berkeley.edu/~dawnsong/papers/polygraph.pdf>>, (2005), 16 pages.

Perdisci, Roberto et al. "Behavioral Clustering of HTTP-Based Malware and Signature Generation Using Malicious Network Traces", Retrieved from <<http://www.gtnoise.net/papers/2010/perdisci:nsdi2010.pdf>>, (2010), 14 pages.

Perdisci, Roberto et al., "McBoost: Boosting Scalability in Malware Collection and Analysis Using Statistical Classification of Executables", Retrieved from <<http://ieeexplore.ieee.org/stamp/stamp.jsp?arnumber=04721567>>, (2008), 10 pages.

Polychronakis, Michalis et al., "Emulation-based Detection of Non-self-contained Polymorphic Shellcode", Retrieved from http://citeseerx.ist.psu.edu/viewdoc/download;jsessionid=2F2CFE927EEE1C0712BBD2796535629F?doi=10.1.1.80.2785&rep=rep1&type=pdf>>, (2007), 20 pages.

Provos, Niels et al., "All your iFrames Point to Us", Retrieved from "http://static.googleusercontent.com/external_content/untrusted_dlcp/research.google.com/en//archive/provos-2008a.pdf", (Feb. 4, 2008), 22 pages.

Provos, Niel et al., "The Ghost in the Browser Analysis of Web-based Malware", Retrieved from <<http://www.usenix.org/event/hotbots07/tech/full_papers/provos/provos.pdf>>, (2007), 9 pages.

Ratanaworabhan, Paruj et al., "Nozzle: A Defense against Heap-spraying Code Injection Attacks", <<http://www.usenix.org/events/sec09/tech/full_papers/ratanaworabhan.pdf>>, (Nov. 2008), 18 pages.

Ratanaworabhan, Paruj et al., "Nozzle: A Defense Against Memory-based Code Execution Attacks", 2008 *ACM TBD*, Downloaded from Client website on Oct. 21, 2010, (Aug. 2009), 9 pages.

Reis, Charles et al., "Browsershield: Vulnerability-Driven Filtering of Dynamic HTML", vol. 1, Issue 3, *ACM Press New York, NY, USA*, (Sep. 2007), 14 pages.

Roesch, Martin "Snort: Lightweight Intrusion Detection for Networks", *13th LISA Conference*. Retrieved from <<http://www.usenix.org/event/lisa99/full_papers/roesch/roesch.pdf>>, (1999), 11 pages.

Seifert, Christian et al., "Identification of Malicious Web Pages with Static Heuristics", Retrieved from <<http://homepages.mcs.vuw.ac.nz/~cseifert/publications/cseifert_staticheuristics_ATNAC2008.pdf>>, (2008), 6 pages.

Seifert, Christian et al., "Know your Enemy: Malicious Web Servers", Retrieved from <<http://www.net-security.org/dl/articles/KYE-Malicious_Web_Servers.pdf>>, (Aug. 9, 2007), 25 pages.

Song, Chengyu et al., "Preventing Drive-by Download via Inter-module Communication Monitoring", ASIACCS '10, Apr. 13-16, 2010, Beijing, China. Retrieved from <<http://ercis.icst.pku.cn/modules/blog/wp-content/uploads/2010/07/1272322543985314844.pdf>>, (Apr. 13, 2010), 11 pages.

Stuurman, Thijs et al;., "Honeyclients—Low Interaction Detection Methods", Retrieved from <<http://staff.science.uva.nl/~delaat/sne-2007-2008/p21/report.pdf>>, (Feb. 4, 2008), 38 pages.

Toth, Thomas et al., "Accurate Buffer Overflow Detection via Abstract Payload Execution", Retrieved from <<http://citeseerx.ist.psu.edu/viewdoc/download;jsessionid=602BFBBEB9EB67DC845DA904C302B153?doi=10.1.1.67.8208&rep=rep1&type=pdf>>, (2002), 17 pages.

Van Gundy, Matthew et al., "Noncespaces: Using Randomization to Enforce Information Flow Tracking and Thwart Cross-site Scripting Attacks", Proceedings of the 19th Annual Network and Distributed System Security Symposium (NDSS), San Diego, CA. Retrieved from <<https://www.isoc.org/isoc/conferences/ndss/09/pdf/03.pdf>>, (Feb. 8, 2009), 13 pages.

Wang, Yi-Man et al., "Automated Web Patrol with Strider HoneyMonkeys: Finding Web Sites that Exploit Browser Vulnerabilities", Retrieved from <<http://citeseerx.ist.psu.edu/viewdoc/download?doi=10.1.1.100.224&rep=rep1&type=pdf >>, (Jul. 27, 2005), 12 pages.

Zhuge, Jianwei et al., "Studying Malicious Websites and the Underground Economy of the Chinese Web", Retrieved from <<http://honeyblog.org/junkyard/reports/www-china-TR.pdf>>, (Dec. 3, 2007), 18 pages.

Sharif, Monirul I., "Robust and Efficient Malware Analysis and Host-Based Monitoring", Retrieved at <<http://smartech.gatech.edu/bitstream/handle/1853/37220/sharif_monirul_i_201012_phd.pdf?sequence=1>>, Dec. 2010, pp. 205.

"Detection of Code-Based Malware", 13031061, Filed Date: Feb. 18, 2011, Pages.

"Final Office Action", U.S. Appl. No. 13/031,061, filed Jul. 3, 2013,15 pages.

"Notice of Allowance", U.S. Appl. No. 13/031,061, filed Dec. 3, 2013, 12 pages.

"Supplemental Notice of Allowance", U.S. Appl. No. 13/031,061, filed Feb. 6, 2014, 8 pages.

\* cited by examiner

EXECUTION OF MULTIPLE EXECUTION PATHS

BACKGROUND

Today's digital environment provides users with access to a wide variety of computer-based media, such as applications, webpages, video content, audio content, and so on. Such media is typically implemented via some form of computer-executable program code. Accordingly, attributes of media can often be ascertained by inspecting computer-executable code associated with the media.

For example, some media may include computer-executable code that can be harmful to a user's computing device. One example of such code is known as malware. Malware includes computer code (e.g., a software application, a utility, or other code) that can interfere with a computer's normal functioning. Typically, a computer is inadvertently exposed to malware when a user accesses media associated with the malware. For example, a user can open an email attachment that includes the malware or can navigate to a website that can cause the malware to be loaded onto the user's computing device. While some existing techniques can inspect computer-executable code in an attempt to detect and prevent malware infection of a computing device, some forms of malware continue to be difficult to detect.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for execution of multiple execution paths are described. In one or more embodiments, an execution of a portion of executable code is conditioned upon a value of a particular variable. For example, the execution of the executable code can cause one type of output if the value of the variable equals a particular value, and can cause a different type of output if the value of the variable equals a different value. Techniques discussed herein can enable the executable code to be executed such that multiple outputs are produced, e.g., by executing the code according to the different values for the variable. In implementations, the multiple outputs can be analyzed for various attributes, such as malware, coding errors, and so on.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for execution of multiple execution paths are described. In one or more embodiments, an execution of a portion of executable code is conditioned upon a value of a particular variable. For example, the execution of the executable code can cause one type of output if the value of the variable equals a particular value, and can cause a different type of output if the value of the variable equals a different value. Techniques discussed herein can enable the executable code to be executed such that multiple outputs are produced, e.g., by executing the code according to the different values for the variable.

For example, consider a scenario where the presentation of a webpage is conditioned upon which version of a web browser is being used to access the website. For instance, if the web browser is a newer version of the web browser, a first version of the webpage can be presented. If the web browser is an older version, however, a second version of the webpage can be presented. Techniques discussed here can enable executable code associated with the webpage to be executed such that both the first version and the second version of the webpage can be output. For example, embodiments can enable the executable code associated with the webpage to be executed as if the website were being accessed by both the newer version and the older version of the web browser.

In at least some embodiments, techniques discussed herein can be enabled via a symbolic representation of values used in executable code. For example, the techniques can determine that executable code includes a variable to which multiple values can be assigned. With reference to the example discussed above, the variable can be the web browser version, and values that can be assigned to the variable can include different versions of the browser.

In implementations, instead of assigning a particular value to the variable (e.g., a particular browser version) when the variable is initially encountered, the variable can be represented as a symbolic value that can be used during execution of portions of the executable code. When execution of the executable code calls for a particular output to be provided based on the variable, the symbolic value can be replaced with one or more concrete values.

For example, a conditional statement that depends on the symbolic value can be executed based on the concrete values to provide different outputs based on different concrete values. For instance, with reference to the example discussed above, the executable code can correspond to the webpage and the concrete values can correspond to the different versions of the web browser. When the execution of the executable code calls for a particular version of the webpage to be displayed, a symbolic value that corresponds to the web browser version can be replaced with concrete values that correspond to different web browser versions. The executable code can be executed based on the concrete values to provide different versions of the webpage that correspond to the different web browser versions.

Techniques discussed herein can be used to implement a wide variety of functionalities. Examples of such functionalities include malware detection, detection of errors in executable code (e.g., bug detection), software optimization, and so on. Examples of such implementations are discussed in more detail below.

In the following discussion, an example environment is first described that is operable to employ techniques for execution of multiple execution paths described herein. Next, a section entitled "Example Methods" describes some example methods in accordance with one or more embodiments. Following this, a section entitled "Example Execution Engine" describes an example execution engine in accordance with one or more embodiments. Finally, an example system and device are described that are operable to employ techniques discussed herein in accordance with one or more embodiments.

Example Environment

Figure 1:
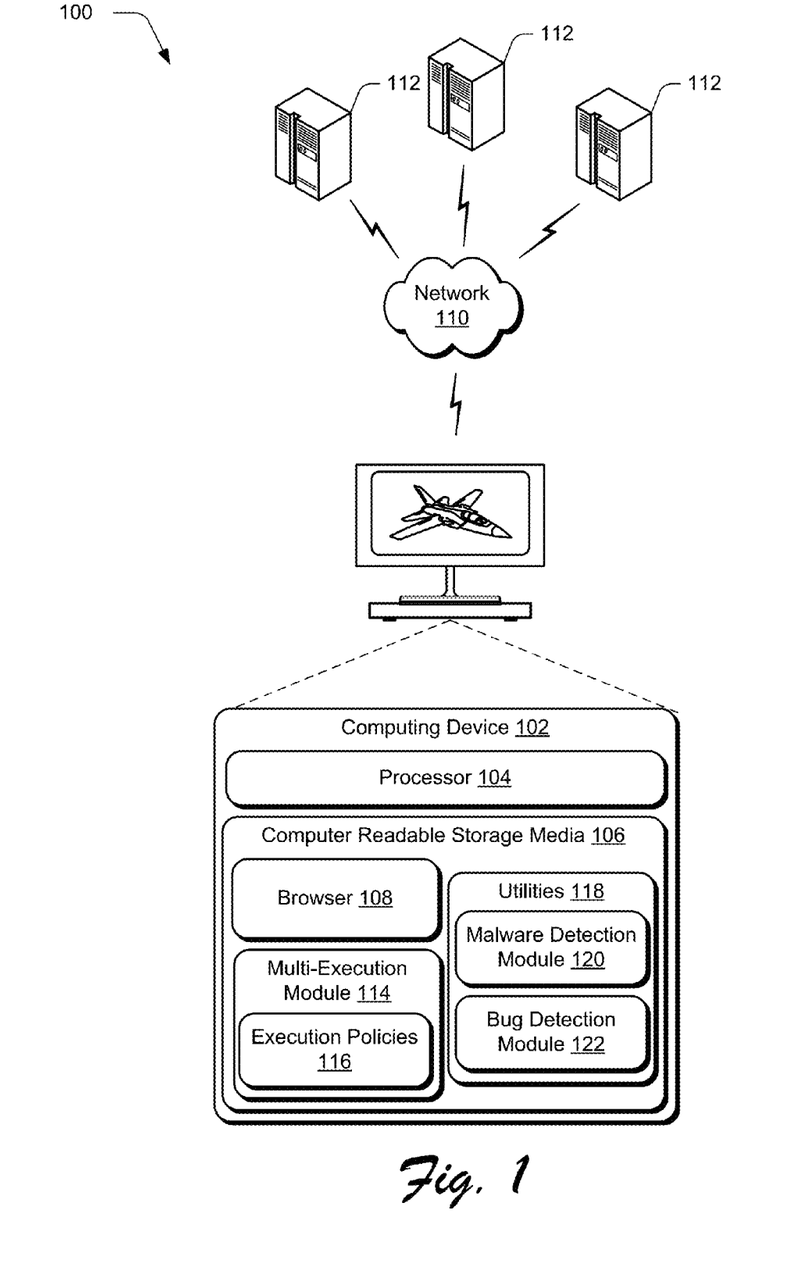
FIG. 1 is an illustration of an environment in an example implementation that is operable to employ techniques discussed herein.

FIG. 1 is an illustration of an environment 100 in an example implementation that is operable to employ techniques for execution of multiple execution paths discussed herein. Environment 100 includes a computing device 102 having one or more processors 104, one or more computer-readable storage media 106, and a browser 108 that resides on the computer-readable storage media 106 and which is executable by the processor 104. Computing device 102 can be embodied as any suitable computing device such as, by way of example and not limitation, a desktop computer, a portable computer, a handheld computer such as a personal digital assistant (PDA), mobile phone, tablet computer, and the like. One of a variety of different examples of a computing device 102 is shown and described below in FIGS. 4 and 5.

The browser 108 is representative of functionality (e.g., a web browser) that is configured to navigate via a network 110 to access one or more web resources 112. Although the network 110 is illustrated as the Internet, the network may assume a wide variety of configurations. For example, the network 110 may include a wide area network (WAN), a local area network (LAN), a wireless network, a public telephone network, an intranet, and so on. Further, although a single network 110 is shown, the network 110 may be configured to include multiple networks.

The browser 108, for instance, may be configured to navigate via the network 110 to interact with content available from the web resources 112 as well as communicate data to the one or more web resources 112, e.g., perform downloads and uploads. The web resources 112 may include any suitable computing resource that is configured to provide content that is accessible via the network 110. Examples of such content include webpages, text content, video, audio, and so on.

The computer-readable storage media 106 further includes a multi-execution module 114, which is representative of functionality to implement techniques for execution of multiple execution paths discussed herein. The multi-execution module 114 can be implemented as a virtual machine, a language runtime service, a compiler, a source-to-source or binary-to-binary code translator, and/or other functionality that can parse and/or modify executable code to enable multiple execution paths to be executed at once. Further functionalities and implementations of the multi-execution module 114 are discussed in more detail below.

The multi-execution module 114 includes and/or makes use of one or more execution policies 116, which are representative of functionality to specify particular variables and/or configuration parameters that are to be used in executing executable code. For example, such variables can refer to device configuration parameters, such as hardware configurations, software configurations, network connection status, and so on. The execution policies 116 can specify that variables related to particular configuration parameters are to be represented using symbolic values, implementations of which are discussed below. The execution policies 116 can also specify output policies that indicate how such symbolic values are to be replaced with concrete values at certain points during the execution of executable code, e.g., when executable code calls for some type of output based on symbolic values. In implementations, a concrete value refers to an actual value that can be assigned to a variable, e.g., when executable code calls for an output based on the variable.

Also illustrated are one or more utilities 118 which are stored on the computer-readable storage media 106 and which are executable by the processor 104. The utilities 118 are representative of functionality to perform various tasks via the computing device 102, such as malware detection, software error detection, software optimization, and so on. The utilities 118 may be configured to access the network 110, e.g., directly themselves and/or through the browser 108. For example, one or more of the utilities 118 may be configured to access one or more of the web resources 112 to retrieve and/or upload content. Thus, the utilities 118 may also be configured for a variety of functionality that may involve direct or indirect network 110 access. For instance, the utilities 118 may include configuration settings and other data that may be leveraged locally by the utilities 118 as well as synchronized with applications that are executed on another computing device. In this way, these settings may be shared by the devices. A variety of other instances are also contemplated. Thus, the computing device 102 may interact with content in a variety of ways from a variety of different sources.

Included as part of the utilities 118 are a malware detection module 120 and a bug detection module 122. The malware detection module 120 is representative of functionality to inspect various forms of executable code to determine if the executable code may include malicious executable code. Malicious executable code can include computer code that, if executed via the computing device 102, may cause undesirable and/or abnormal performance of the computing device. In implementations, if the malware detection module 120 detects malware and executable code, the malware detection module can prevent the executable code from accessing sensitive portions of the computing device 102. Alternatively or additionally, the malware detection module 120 can present one or more notifications of the presence of the malware, such as via the browser 108.

The bug detection module 122 is representative of functionality (e.g., a debugger) to inspect executable code for errors (e.g., bugs, compiler errors, and so on) and/or to determine if changes can be made to the executable code to optimize the execution performance of the executable code.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Example Methods

Discussed below are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Figure 2:
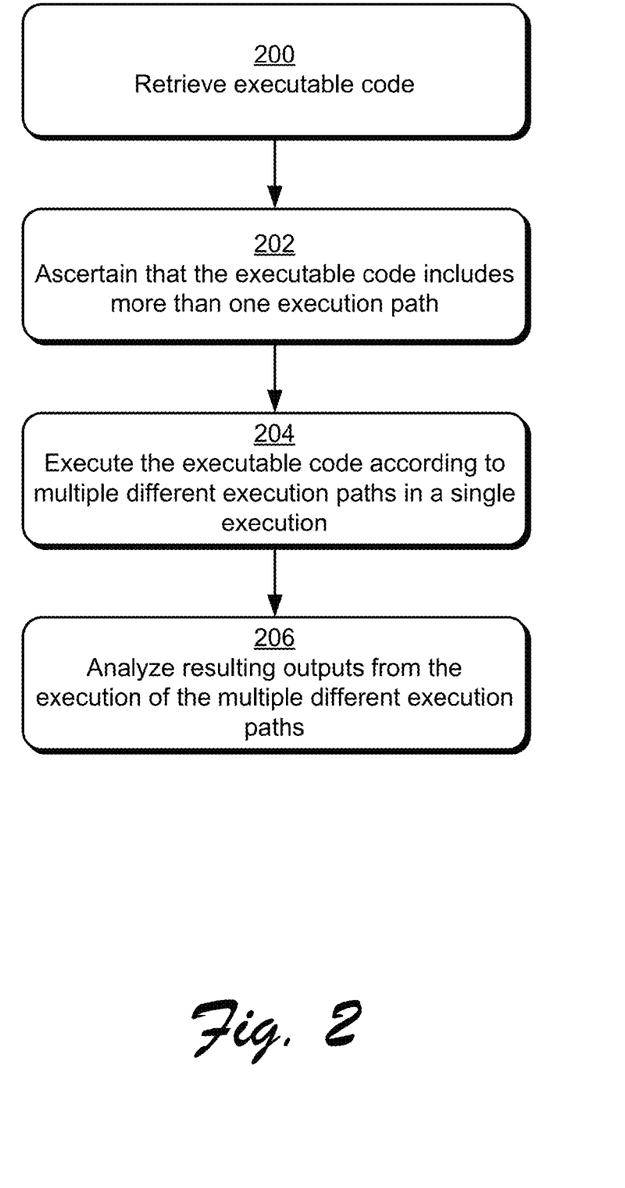
FIG. 2 is a flow diagram that describes steps in a method in accordance with one or more embodiments.

FIG. 2 is a flow diagram that describes steps in a method in accordance with one or more embodiments. Step 200 retrieves executable code. For example, the multi-execution module 114 can retrieve content (e.g., a webpage) from the web resources 112 that includes executable code, such as via interaction with the browser 108.

Step 202 ascertains that the executable code includes more than one execution path. For example, the executable code can include an "if-then-else" statement, the execution of which depends on a particular variable value and/or condition. If a particular condition is true, execution of the executable code can proceed according to a particular path, e.g., the "if-then" path. If the particular condition is false, however, execution of the executable code can proceed according to a different path, e.g., the "else" path. Examples of other code execution cases utilizing techniques herein are discussed below.

As mentioned above, such variable values and/or conditions can refer to configuration parameters for a device, such as hardware, software, and/or network configuration parameters, and so on. Examples of hardware configuration parameters can include indications of particular types of hardware, versions of hardware, hardware drivers, and so on, that are installed on a device.

Software configuration parameters can refer to types, instances, and/or versions of software that are installed on a device. Software configuration parameters can also refer to specific types and/or versions of plug-ins that are installed on a device. For example, with reference to the browser 108 discussed above, the software configuration parameters can refer to browser names, user agent strings, browser versions, names and/or versions of plug-ins installed for a browser, OS version, hardware version, attached devices (e.g., device types), system configuration information, and so on.

Examples of network configuration parameters can include types of networks to which a computing device is connected, whether a computing device is connected to a network, amounts of network bandwidth available to the computing device, and so on. These configuration parameters are presented for purposes of example only, and a variety of other configuration parameters may also be used within the spirit and scope of the claimed embodiments.

In implementations, executable code associated with a webpage can specify that if a particular browser version and/or browser plug-in are present, content from one source can be loaded and processed. The executable code can further specify that if the particular browser version and/or browser plug-in are not present, content from a different source can be loaded and processed. Thus, the webpage can be associated with different sources from which content can be retrieved, depending on a particular environment from which the website is accessed.

Step 204 executes the executable code according to multiple different execution paths in a single execution. For instance, the multi-execution module 114 can initiate execution of the executable code in a sub-environment of the computing device 102, such as a virtual machine. The multi-execution module 114 can apply multiple conditions (e.g., multiple variable values) to the execution of the executable code such that the execution follows multiple different and alternative execution paths. In implementations, execution of the multiple execution paths can cause multiple different types of output to result from the execution of the executable code. For example, with reference to the webpage example above, executing the multiple different execution paths can cause different instances of content associated with the webpage to be accessed from different sources based on a single execution of the webpage's executable code. Example ways for executing multiple execution paths in a single execution are discussed in more detail below.

Step 206 individually analyzes resulting outputs from the execution of the multiple different execution paths. For example, execution of the multiple different execution paths can result in multiple different outputs. The multiple different outputs can be analyzed by various functionalities, e.g., to determine various attributes of the outputs.

With reference to malware detection techniques, the resulting outputs can be submitted to a malware detection functionality, e.g., the malware detection module 120. The malware detection functionality can inspect the resulting outputs to determine if one or more of the outputs may include malware.

For example, consider the following malware detection scenario. A programmer writes executable code for a website. In the executable code, the programmer includes a conditional statement that specifies that different instances of content from different sources for the website are to be provided to different web browsers. For example, if "Browser X" is used to access the website, a benign instance of content from one source is to be provided to the Browser X. If "Browser Y" is used to access the website, however, a malicious instance of content from a different source is to be provided to the Browser Y. For instance, the Browser X can be a browser that is resistant to a particular malware exploit, whereas the Browser Y may be vulnerable to the exploit. Thus, the benign instance of content and the malicious instance content each represent different execution paths for the website code. Writers of malware can use multiple execution paths and execution conditions that target malware to more vulnerable device types and/or device configurations. Techniques discussed herein can cause the different execution paths to be executed such that the malicious instance of content can be detected, e.g., by the malware detection module 120.

In implementations, the resulting outputs can be submitted to a software analysis functionality to determine possible errors associated with and/or optimizations for the executable code. For example, with reference to error detection, the resulting outputs can be submitted to an error detection functionality, such as the bug detection module 122. The error detection functionality can inspect the resulting outputs to determine if the outputs indicate the presence of one or more coding errors in the executable code. If an error is detected, the error detection functionality can repair the error and/or can generate a notification of the error.

With reference to optimizations for executable code, the resulting outputs can be analyzed to determine various data types associated with expressions in the executable code. For example, techniques for concrete type inference can be performed to determine types (e.g., string, integer, Boolean value, floating-point number, and so on) for expressions in the program. Determining types for variables can enable executable code to be optimized (e.g., changed) such that the code can be more efficiently compiled and/or executed.

Figure 3:
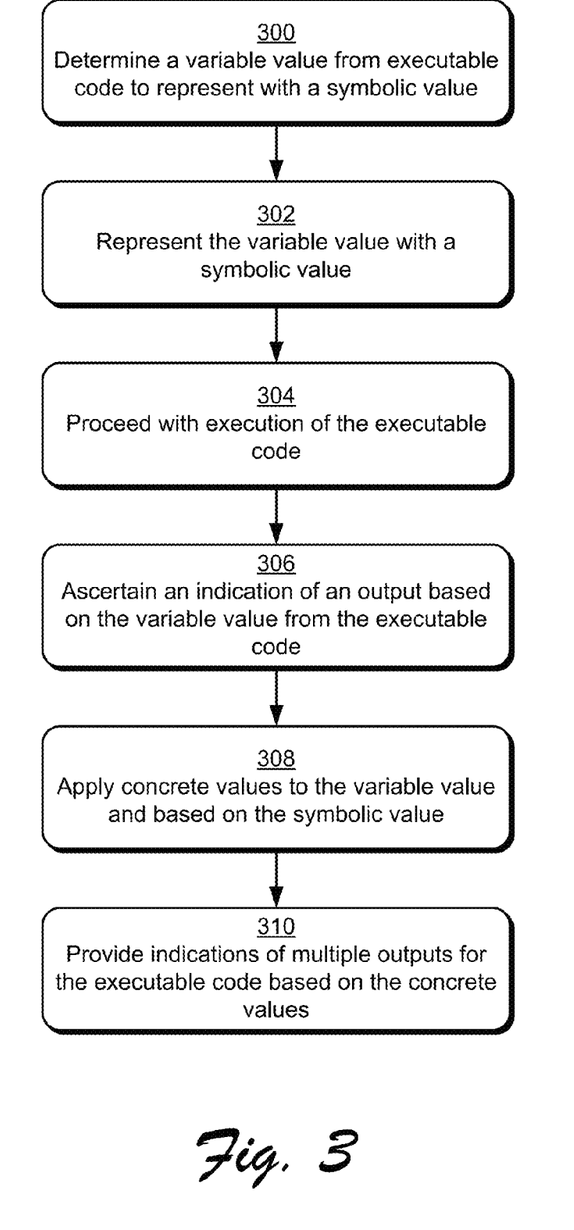
FIG. 3 is a flow diagram that describes steps in a method in accordance with one or more embodiments.

FIG. 3 is a flow diagram that describes steps in a method in accordance with one or more embodiments. In at least some embodiments, this method describes a more detailed implementation of the method described above in FIG. 2.

Step 300 determines a variable value from executable code to represent with a symbolic value. As discussed above and below, variable values can be utilized by executable code to determine various execution paths to be taken during the execution of the code. As also mentioned above, such variable values can refer to configuration parameters for a device, examples of which are given above.

As one example implementation, consider the following executable code. In implementations, the executable code can be retrieved (e.g., by the multi-execution module 114) from an instance of content, such as a webpage.

```
1    var qt_plugin = "0";
2    var name = navigator.plugins[0].name;
3    if (qt_plugin == 0 && name.indexOf("PluginX") != −1) {
4        var helper = parseInt(name.replace(/\D/g," "));
5        if (helper >0){
6            qt_plugin = helper.toString(16)
7        }
8    }
9    output (qt_plugin);
            . . .
        [additional executable code]
```

As indicated at lines 1 and 2, the executable code includes a plug-in related variable. At lines 3-6, the executable code seeks to determine whether a plug-in named "PluginX" is present, e.g., installed on a machine on which the executable code is executing. Line 9 outputs a value for the plug-in related variable, e.g., a value that indicates whether or not the "PluginX" plug-in is present.

In implementations, techniques discussed herein can provide ways to give a variable values that are conditional on whether or not a particular environment in which executable code is being executed has certain attributes, e.g., certain configuration parameters. With reference to the current example, this can refer to the presence or not of "PluginX."

Step 302 represents the variable value with a symbolic value. For example, consider the example executable code above. Instead of calculating a concrete value for the plug-in related variable (e.g., whether or not the "PluginX" is present), the value for the plug-in related variable can be represented as symbolic. For instance, the output indicated at line 9 of the executable code can be represented symbolically.

In implementations, a symbolic value can include a function or other representation of a value that can be used to initiate one or more tasks during an execution of executable code. For example, the following function can be used as a symbolic value to represent a variable value for the output indicated at line 9 of the executable code above.

```
function (navigator) {
    var name = navigator.plugins[0].name;
    return ("0" == 0 && name.indexOf("PluginX ") != −1) ?
        parseInt(name.replace(/\D/g," ")) ?
            parseInt(name.replace(/\D/g," ")).toString(16) :
            "0" :
        "0" :
}
```

As indicated, this symbolic value includes an evaluation function that maintains the conditional aspect of the original executable code.

Step 304 proceeds with execution of the executable code. For example, with reference to the executable code excerpted above, the "[additional executable code]" can be executed. Continuing with the ongoing example, the executable code can include the following statement.

var fingerprint=qt_plugin

Thus, a "fingerprint" variable can be declared that indicates whether or not the "PluginX" plug-in is present. In implementations, the symbolic value can be propagated through the execution of the executable code and thus can be used to represent a value for the "PluginX" plug-in.

Step 306 ascertains an indication of an output based on the variable value from the executable code. With reference to the ongoing example, the executable code can include the following statement.

fetch_content (fingerprint)

Thus, the executable code can request that content be retrieved based on the fingerprint, e.g., based on a value for the "PluginX" plug-in.

Step 308 applies concrete values to the variable value and based on the symbolic value. For example, the concrete values can be applied in response to the indication of the output based on the variable value. In implementations, concrete values can be provided for a variable value based on the one or more of the execution policies 116, discussed above. In implementations, the execution policies 116 can specify particular configuration values to be provided for values associated with particular configuration parameters, examples of which are discussed above. With reference to the ongoing example, the variable aspect for the "qt_plugin" plug-in variable maintained by the symbolic value indicated above can be used to apply multiple concrete values to the variable value.

Step 310 provides indications of multiple outputs for the executable code based on the concrete values. For example, one concrete value can indicate the presence of the "PluginX" plug-in, and thus one output can be indicated based on the presence of the plug-in. Further, a different concrete value can indicate that the "PluginX" plug-in is not present, and thus a different output can be indicated based on the absence of the plug-in. Thus, the multiple outputs can correspond to multiple execution paths that can be executed for the executable code, e.g., as part of a single execution of the executable code.

Although examples are discussed herein with reference to two different execution paths, this is not intended to be limiting. For example, techniques discussed herein can be implemented to execute executable code according to more than two different execution paths, and such implementations are considered to be within the spirit and scope of the claimed embodiments.

Example Execution Cases

While embodiments are discussed herein with reference to the execution of if-then-else statements, techniques can be utilized in the execution of a wide variety of different code constructs. For example, techniques can be utilized in the execution of a "while" loop. If the loop is treated symbolically, only one iteration is executed.

Techniques can also be utilized to simulate various exception handling scenarios in accordance with one or more embodiments. For example, if executable code includes and/or references functionality for handling a certain exception (e.g., an exception handler subroutine), techniques can be implemented to execute the code such that the functionality is invoked. For instance, techniques discussed herein can be utilized to execute the executable code according to at least two execution paths, such as based on the occurrence of an exception and the non-occurrence of the exception. In implementations, with reference to the webpage scenarios discussed herein, the occurrence of an exception can cause content from one source to be retrieved, and the non-occurrence of the exception can cause content from a different source to be retrieved. Thus, the different instances of content from the different sources can be analyzed for their various attributes, as discussed elsewhere herein.

These execution cases are presented for purposes of illustration only, and a wide variety of different code constructs and execution cases are encompassed within the claimed embodiments. Having discussed some example execution cases, consider now an example execution engine in accordance with one or more embodiments.

Example Execution Engine

Excerpted below is a section of pseudocode that provides an example implementation of an execution engine that can be used to implement techniques discussed herein. For instance, the execution engine can be included as part of and/or accessed by the multi-execution module 114 to enable the execution of multiple execution paths. The example execution engine is presented for purposes of illustration only, and a wide variety of different algorithms and/or functionalities can be utilized to implement techniques discussed herein while remaining within the spirit and scope of the claimed embodiments.

```
MultiExecute(P = {stmt₁, ... stmtₙ}; π; L; Γ = default(globalObject))
 1:    for I = 1 ... n do
 2:       switch stmtᵢ:
 3:          case if (e) then Tₜ else Tf
 4:             if isSymbolic(e) then
 5:                Γ'ₜ = [ ]
 6:                Γ'ₜ.prototype = Γ
 7:                MultiExecute(Tₜ, π, L, modₜ)
 8:                Γ'f = [ ]
 9:                Γ'f.prototype = Γ
10:                MultiExecute(Tf, π, L, modf)
11:                Γ = Range(Γₜ) ∩ Range(Γf)
12:                for all v in Γ do
13:                   Γ[vₜ] = Γₜ[v]
14:                   Γ[vf] = Γf[v]
15:                   Γ[v] = φ(e, vₜ, vf)
16:                end for
17:                for all v in (Range(modₜ) \ Γ) do
18:                   Γ[v] = φ(e, v, vₜ)
19:                end for
20:                for all v in (Range(modf) \ Γ) do
21:                   Γ[v] = φ(¬e, v, vf)
22:                end for
23:             else
24:                if e then
25:                   Tₜ
26:                else
27:                   Tf
28:                end if
29:             end if
30:          end case
31:          case while(e) do T
32:             l_head
33:             if isSymbolic(e) then
34:                Γ' [ ]
35:                Γ'.prototype = Γ36: MultiExecute(T, π, L, Γ'
37:                for all v in Range(Γ') do
38:                   Γ[v] = φ (e; Γ' [v]; Γ[v])
39:                end for
40:                goto l_end
41:             else
42:                if e then
43:                   T
44:                   goto l_head
45:                else
46:                   goto l_end
47:                end if
48:             end if
49:             l_end:
50:          end case
51:          case v = e
52:             Γ[v] = e
53:          end case
54:          case v₁ = v₂
55:             Γ[v₁] = Γ[v₂]
56:          end case
57:          case output(e)
58:             L(e; i; π; Γ)( )
59:          end case
60:       end switch
61:    end for
```

In the pseudocode above, P refers to executable code (e.g., a program) which is a collection of statements "stmt₁, ... stmtₙ." Further, the executable code can be executed via the execution engine according to a browser profile π. For instance, the browser profile π refers to browser configuration parameters for a browser that is being used to access to executable code P. Examples of configuration parameters are discussed above. The variable L refers to execution policies (e.g., the execution policies 116) that are implemented in executing the executable code. Further, the gamma function "Γ" generates a hash map that is created during the implementation of the execution engine, for example, to represent one or more effects of calling the MultiExecute function.

Further to the execution engine, the profile π includes specific details of an environment that is being represented during the execution of the executable code P, such as the plugins that are present in the environment, software versions that are present, data that can be accessed from the environment, and so on. Further, with reference to script-based implementations, the profile π can indicate a version of the scripting engine that is being implemented.

The execution policies L specify how to concretize a symbolic value at an output statement. For example, the execution policies L can specify that a symbolic value is to be made concrete by expanding it into multiple executable statements that can be executed to provide different outputs. The execution policy L can further define how to concretize a particular value e at an output statement i given profile π. A variety of different execution policies L can be implemented, including concretizing e with respect to π, sequentially outputting some or all concrete values in e, and so on.

The example execution engine further includes a merge function "Ø" that can be used to merge multiple values together. For example, the merge function can be implemented according to static single assignment form (SSA form) to combine variables for propagation through executable code. For instance, consider line 15 of the example execution engine. In line 15, the merge function Ø is implemented to combine the e, $v_t$, $v_f$ values for the Γ (v) parameter.

With reference to the "mod" arguments, these add variable that are modified during the execution of the execution engine back into the Γ functions. For example, the execution of executable code using symbolic variables can produce certain side effects. The mod arguments enable such side effects to be propagated through the code such that when concrete values are applied the proper output is produced.

To illustrate example ways of implementing techniques discussed herein, the example execution engine execution addresses several cases that can arise during the execution of executable code. For example, lines 3 through 30 enable multiple execution paths of an if-then-else statement to be executed. Further, lines 31 through 53 enable a loop condition (e.g., using the while-else statement) to be executed according to techniques discussed herein. Still further, lines 51-53 and 54-56 enable assignments of values to variables using symbolic values, as discussed in detail above.

The execution engine presented above provides example ways in which techniques discussed herein can be applied to a simplified set of programming constructs. The illustrated cases are provided for purposes of example only, and the claimed embodiments encompass a wide variety of different programming constructs and scenarios not specifically mentioned herein.

Thus, an execution engine can be provided that can enable multiple alternative conditional statements in executable code to be executed as part of a single execution of the executable code. Having discussed an example execution engine, consider now an example system and device in accordance with one or more embodiments.

Example System and Device

Figure 4:
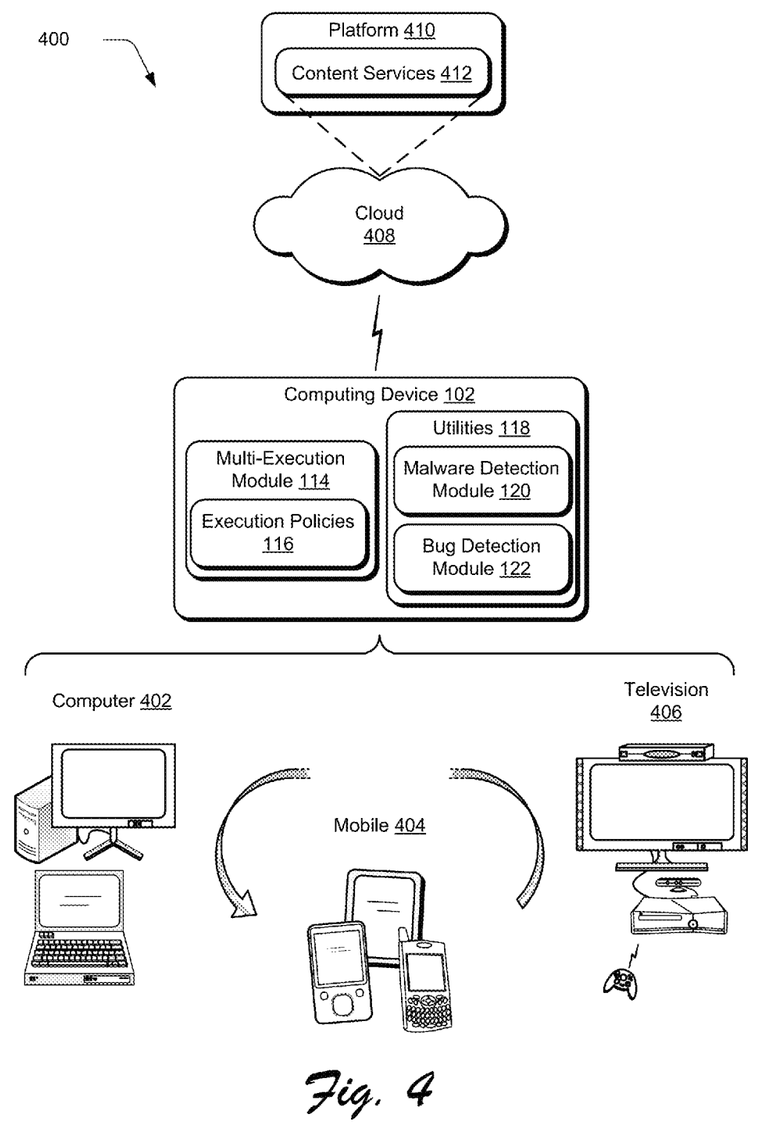
FIG. 4 illustrates an example system that includes the computing device as described with reference to FIGS. 1 and 5.

FIG. 4 illustrates an example system 400 that includes the computing device 102 as described with reference to FIGS. 1 and 5. The example system 400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 400, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link. In one or more embodiments, this interconnection architecture enables functionality to be delivered across multiple devices to provide a common and seamless experience to a user of the multiple devices. Each of the multiple devices may have different physical attributes and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 402, mobile 404, and television 406 uses. Each of these configurations includes devices that may have generally different constructs and capabilities, and thus the computing device 102 may be configured according to one or more of the different device classes. For instance, the computing device 102 may be implemented as the computer 402 class of a device that includes a personal computer, desktop computer, a multi-screen computer, laptop computer, netbook, and so on.

The computing device 102 may also be implemented as the mobile 404 class of device that includes mobile devices, such as a mobile phone, portable music player, portable gaming device, a tablet computer, a multi-screen computer, and so on. The computing device 102 may also be implemented as the television 406 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 408 includes and/or is representative of a platform 410 for content services 412. The platform 410 abstracts underlying functionality of hardware (e.g., servers) and software resources of the cloud 408. The content services 412 may include applications and/or data that can be utilized while computer processing is executed on servers that are remote from the computing device 102. Content services 412 can be provided as a service over the Internet and/or through a subscriber network, such as a cellular or Wi-Fi network.

The platform 410 may abstract resources and functions to connect the computing device 102 with other computing devices. The platform 410 may also serve to abstract scaling of resources to provide a corresponding level of scale to encountered demand for the content services 412 that are implemented via the platform 410. Accordingly, in an interconnected device embodiment, implementation of functionality described herein may be distributed throughout the system 400. For example, the functionality may be implemented in part on the computing device 102 as well as via the platform 410 that abstracts the functionality of the cloud 408, as shown through inclusion of the various functionalities of the computing device 102.

Figure 5:
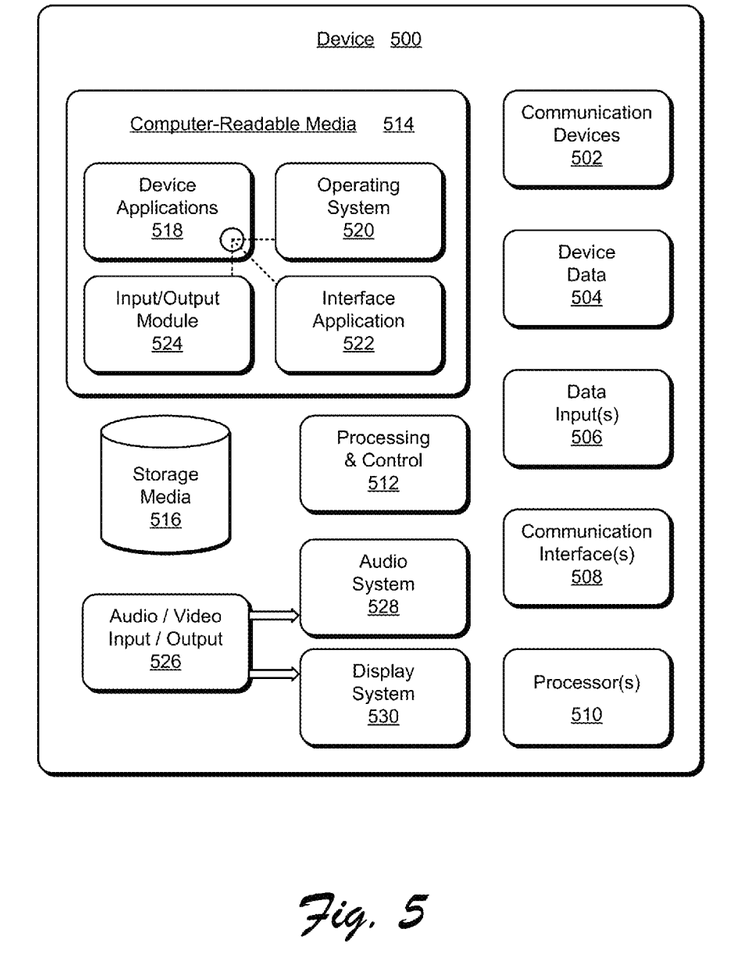
FIG. 5 illustrates various components of an example device that can be implemented as any type of portable and/or computer device as described with reference to FIGS. 1 and 4 to implement embodiments of the techniques described herein.

FIG. 5 illustrates various components of an example device 500 that can be implemented as any type of device 102 as described with reference to FIG. 1 to implement embodiments of the techniques described herein. Device 500 includes communication devices 502 that enable wired and/ or wireless communication of device data 504 (e.g., received data, data that is being received, data scheduled for broadcast, data packets of the data, etc.).

The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content and/or data source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication link between device 500 and a communication network by which other electronic, computing, and communication devices communicate data with device 500.

Device 500 includes one or more processors 510 (e.g., any of microprocessors, controllers, and the like) which process various computer-executable instructions to control the operation of device 500 and to implement embodiments of the techniques described herein. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 510. The device applications 518 can include a device manager (e.g., a control application, software application, signal processing and control module, code that is native to a particular device, a hardware abstraction layer for a particular device, etc.). The device applications 518 also include system components or modules to implement embodiments of the techniques described herein.

In this example, the device applications 518 include an interface application 522 and an input/output module 524 that are shown as software modules and/or computer applications. The input/output module 524 is representative of software that is used to provide an interface with a device configured to capture inputs, such as a touchscreen, track pad, camera, microphone, and so on. Alternatively or in addition, the interface application 522 and the input/output module 524 can be implemented as hardware, software, firmware, or any combination thereof. Additionally, the input/output module 524 may be configured to support multiple input devices, such as separate devices to capture visual and audio inputs, respectively.

Device 500 also includes an audio and/or video input-output system 526 that provides audio data to an audio system 528 and/or provides video data to a display system 530. The audio system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, the audio system 528 and/or the display system 530 are implemented as external components to device 500. Alternatively, the audio system 528 and/or the display system 530 are implemented as integrated components of example device 500.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

CONCLUSION

Techniques for execution of multiple execution paths are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method, comprising:
ascertaining that executable code includes multiple execution paths, the multiple execution paths corresponding to one or more browser configuration parameters for different versions of a browser;
causing the executable code to be executed according to the multiple execution paths in a single execution of the executable code, the execution performed within sub-environments that individually correspond to different respective instances of the different versions of the browser; and
analyzing outputs from the execution of the multiple execution paths for one or more of malware, an error in the executable code, or an optimization for the executable code.

2. A computer-implemented method as described in claim 1, wherein the executable code is retrieved from a webpage, and wherein the outputs correspond to content for the webpage from at least two different sources.

3. A computer-implemented method as described in claim 1, wherein the browser configuration parameters include one or more of an indication of a plug-in version for the browser, an operating system version, or a device type.

4. A computer-implemented method as described in claim 1, wherein the multiple execution paths comprise one or more of an if-then-else statement or a while loop, and wherein:
   if the multiple execution paths comprise the if-then-else statement, said causing comprises causing both an if-then portion and an else portion of the if-then-else statement to be executed as part of the single execution; and
   if the multiple execution paths comprise the while loop, said causing comprises causing the while loop to be executed once such that a condition of terminating the loop is produced.

5. A computer-implemented method as described in claim 1, wherein said causing comprises:
   representing a variable value associated with the multiple execution paths with a symbolic value, the symbolic value being configured to maintain a conditional aspect of the variable value;
   executing at least a portion of the executable code based on the symbolic value; and
   causing concrete values to replace the symbolic value such that the multiple execution paths are further executed based on the concrete values to cause the outputs.

6. A computer-implemented method as described in claim 5, wherein the causing the concrete values to replace the symbolic value is based on one or more execution policies that specify the concrete values.

7. A computer-implemented method as described in claim 1, further comprising at least one of:
   determining that at least one of the resulting outputs includes benign executable code, and that another of the resulting outputs includes malware; or
   determining that multiple of the outputs include malware.

8. A computer-implemented method as described in claim 1, further comprising determining types of variables in the executable code based at least in part on the outputs, and associating the types of variables with one or more expressions in the executable code.

9. A computer-implemented method, comprising:
   representing a variable value in executable code with a symbolic value, the variable value representing a browser configuration parameter within the executable code corresponding to different versions of a browser;
   executing at least a portion of the executable code within sub-environments individually corresponding to different respective instances of the different versions of the browser and based on the symbolic value, the symbolic value maintaining a conditional aspect of the variable value during said executing; and
   applying multiple concrete values to the symbolic value in response to an indication of an output for the symbolic value, said applying causing multiple different outputs to be provided within the sub-environments and based on an execution of the conditional aspect with the multiple concrete values.

10. A computer-implemented method as described in claim 9, wherein said executing and said applying are performed during a single execution of the executable code.

11. A computer-implemented method as described in claim 9, wherein the conditional aspect comprises an if-then-else statement, and wherein said applying comprises replacing the symbolic value with at least one of the multiple concrete values for the if-then portion of the if-then statement, and replacing the symbolic value with at least another of the multiple concrete values for the else portion of the if-then-else statement such that both the if-then portion and the else portion are executed.

12. A computer-implemented method as described in claim 9, further comprising analyzing one or more of the multiple different outputs for malware.

13. A computer-implemented method as described in claim 9, further comprising analyzing one or more of the multiple different outputs for coding errors in the executable code or code optimizations for the executable code.

14. A system comprising:
   one or more hardware processors; and
   one or more computer-readable storage devices storing computer-executable instructions that are executable by the one or more hardware processors, the computer-executable instructions comprising:
      a module including instructions for performing operations including executing executable code within sub-environments according to two or more alternative execution paths in a single execution of the executable code, the alternative execution paths corresponding to one or more browser configuration parameters for different versions of a browser; and
      execution policies that specify how the alternative execution paths are to be executed by the module and that specify within the policies the browser configuration parameters that are to be used to execute the alternative execution paths within the sub-environments.

15. A system as recited in claim 14, wherein the module is configured to execute the executable code by:
   representing a variable value for the executable code with a symbolic value that maintains a conditional aspect of the variable value during execution of at least a portion of the executable code;
   ascertaining an indication of an output for the variable value from the executable code; and
   applying concrete values to the variable value and based on the symbolic value such that execution of the executable code according to the two or more alternative execution paths produces multiple different outputs.

16. A system as recited in claim 15, further comprising a malware detection module configured to individually analyze the multiple different outputs for the presence of malware.

17. A system as recited in claim 15, further comprising a bug detection module configured to individually analyze the multiple different outputs for one or more of coding errors in the executable code or coding optimizations for the executable code.

18. A system as recited in claim 14, wherein the browser configuration parameters comprise one or more of representations of different versions of software plug-ins, different operating systems, or different device types.

19. A system as recited in claim 14, wherein the browser configuration parameters comprise one or more of a software configuration parameter or a hardware configuration parameter.

20. A system as recited in claim 14, wherein the executable code corresponds to a webpage and wherein the operations further include:
   prior to display of the webpage, using the execution policies to provide different outputs of the webpage;
   analyzing the different outputs to ascertain whether one or more of malware or a code error are present in the web page; and
   causing display of the webpage responsive to determining that no malware or no code error is present in the different outputs.

* * * * *